United States Patent

Sasaki et al.

[11] Patent Number: 5,843,578
[45] Date of Patent: Dec. 1, 1998

[54] FILM HAVING FINE VOIDS AND MANUFACTURE THEREOF

[75] Inventors: Yasushi Sasaki; Ken-ichi Mori; Katsuya Ito; Toshitake Suzuki, all of Ohtsu, Japan

[73] Assignee: Toyo Boseki Kabushiki Kaisha, Japan

[21] Appl. No.: 966,953

[22] Filed: Nov. 10, 1997

Related U.S. Application Data

[63] Continuation of Ser. No. 551,594, Nov. 1, 1995, abandoned.

[30] Foreign Application Priority Data

Nov. 2, 1994 [JP] Japan .................................. 6-269995
Jan. 5, 1995 [JP] Japan .................................. 7-28550

[51] Int. Cl.$^6$ .................................................. B32B 27/06
[52] U.S. Cl. ....................... 428/483; 428/315.5; 428/480; 525/177
[58] Field of Search ............................... 428/315.5, 480, 428/483; 525/177

[56] References Cited

U.S. PATENT DOCUMENTS 4,871,784  10/1989  Otonari et al. ......................... 521/138

*Primary Examiner*—Helen L. Pezzuto
*Attorney, Agent, or Firm*—Leydig, Voit & Mayer, Ltd.

[57] ABSTRACT

A polyester film having fine voids, which comprises a polymer mixture comprising a polyester resin and a thermoplastic resin (B) incompatible with said polyester resin, and which has an apparent specific gravity of 0.6–1.3 and an inplane birefringence as determined from the equation:

inplane birefringence=refractive index along lengthwise principal axis–refractive index along crosswise principal axis, of from −0.02 to +0.04, and manufacture thereof. A thermoplastic resin film having fine voids, which comprises a polymer mixture comprising a thermoplastic resin (A) and a thermoplastic resin (B) incompatible with said thermoplastic resin (A), and which has a ratio (L1/L2) of an average length (L1) of the voids at a cross section in the lengthwise direction of the film, to an average length (L2) of the voids at a cross section in the direction forming a right angle with said lengthwise direction, i.e., crosswise direction of the film, of 2/3–3/2, a thickness variation of the film of not more than 5%, and a void content of 5–50% by volume, and manufacture thereof. The polyester film having fine voids of the present invention has an extremely superior isotropy, excellent tear resistance, extremely superior water resistance, moisture absorption, dimensional stability, surface stability, gloss and vividness of printed matters, and mechanical strength, which have been particularly achieved by making apparent specific gravity and inplane birefringence fall within a specific range mentioned above. The thermoplastic resin film having fine voids of the present invention suffers less from curling by heat, which has been achieved by making (L1/L2), thickness variation and void content fall within a specific range mentioned above.

6 Claims, No Drawings

FILM HAVING FINE VOIDS AND MANUFACTURE THEREOF

This is a continuation of application Ser. No. 08/551,594, filed Nov. 1, 1995, now abandoned.

FIELD OF THE INVENTION

The present invention relates to a film having fine voids and manufacture thereof. More particularly, the present invention relates to a film having fine voids which is suitable as substrate materials such as heat transfer image recording paper, heat-sensitive recording paper, sublimation transfer image recording paper, printing sheet, magnetic recording card and various reflectors, and manufacture thereof.

BACKGROUND OF THE INVENTION

A synthetic paper which is produced from a synthetic resin as a main starting material and which is a substitute for paper is superior in water resistance, dimensional stability upon moisture absorption, surface stability, gloss and vividness of printed images and mechanical strength. Based on these advantageous properties, the utility of the synthetic paper has been widening in recent years.

The main starting materials of the synthetic paper are polyolefin resins such as polyethylene and polypropylene, and polyester resins. Of these, polyester resins represented by polyethylene terephthalate are superior in that they have high heat resistance and nerve, and can be used for a wide range of applications.

As a method for preparing, from the main starting material of polyester resins, a film having functions similar to those of paper there have been conventionally known (1) a method wherein fine voids are formed inside the film in large amounts, (2) a method wherein general flat film surfaces are made rough by (2-1) sand blast treatment, (2-2) etching treatment, (2-3) matting treatment (a matting agent is laminated together with a binder) and the like, and other methods. The method (1) is advantageous in that the film itself can have reduced weights, and sufficient flexibility, fine writability and clear printing-transcription enabling properties can be imparted.

A conventionally known method for forming fine voids inside the film comprises melt-kneading a polyester resin and a thermoplastic resin incompatible therewith, preparing a sheet therefrom, with said thermoplastic resin dispersed in a fine particulate state in the polyester resin, and drawing said sheet, in particular, biaxially stretching same in the lengthwise direction and crosswise direction to produce voids around the fine particles.

The thermoplastic resin incompatible with the polyester resin, which is used for producing voids includes, for example, polyolefin resins (e.g. Japanese Patent Unexamined Publication No. 132755/1974), polystyrene resins (e.g. Japanese Patent Examined Publication Nos. 2016/1974, 29550/1979), and polyarylate resins (e.g. Japanese Patent Examined Publication No. 28097/1983). Of these, polypropylene and polystyrene are particularly preferable in that the voids are easily formed, they have low density and they are economically advantageous.

On the other hand, the method comprising biaxial stretching in the lengthwise direction and crosswise direction necessitates addition, in large amounts, of a resin incompatible with a polyester, to the polyester, which leads to substantial inhibition of biaxial stretching to the extent that the draw ratio (particularly lengthwise draw ratio) needs to be set considerably lower than in the case where a conventional polyester film is prepared.

Hence, most of the polyester films having fine voids which have been practically used as synthetic paper, etc. are subject to reinforced crosswise orientation, and have, aided by the voids formed inside, a tendency to allow crosswise tearing during processing wherein a tension is applied in the lengthwise direction of the film, thus posing problems in that the film easily breaks due to a slight flaw made in the film, and fins are easily produced on cutting.

In an attempt to overcome these defects, a film may be improved in isotropy by increasing the lengthwise draw ratio, or the lengthwise drawing may be reinforced. Such drawing is, however, very difficult in view of the above-mentioned inherent properties of the polyester resin having voids, and industrially impractical.

It may well be considered that, by reducing the crosswise draw ratio, the above-mentioned defects can be overcome using conventional techniques. For a crosswise drawing of a film to be uniformly done, a certain level of draw ratio is necessary. Alternatively, an attempt to overcome the defects in the conventional methods inevitably results in inconsistent properties, such as thickness of the film, and stable industrial production is impossible.

The above-mentioned biaxial stretching in the lengthwise direction and crosswise direction is most generally done by a method comprising roll drawing a continuous sheet of a polymer mixture in the longitudinal direction and tenter drawing same in the width direction. For example, the roll drawing (lengthwise drawing) is conducted, to form a multitude of voids, at a temperature of from 80° C. to 100° C. and draw ratio of 2.0–5.0, tenter drawing (crosswise direction) at a temperature of from 80° C. to 140° C. and draw ratio of 2.8–5.0, and then heat treatment after drawing at not less than 150° C. (Japanese Patent Unexamined Publication Nos. 168441/1988, 193938/1988, 80247/1990, 284929/1990, 114817/1991 and 202540/1992).

The thermoplastic resin films having fine voids, which are obtained by conventional techniques, have defects in that curling by heat and wrinkles by heat tend to occur when used as heat-sensitive recording materials and printing sheets.

The present inventors have found that the voids in the thermoplastic resin films having fine voids, which are obtained by conventional technique, tend to become longer in the crosswise direction rather than the lengthwise direction and that this tendency is one of the factors which induces occurrence of curling by heat, and studied from various aspects of isotropy of the voids. By setting the temperature of crosswise drawing to not less than 140° C., the crosswise growth of the voids was suppressed. Concurrently, however, the content of the void was insufficient and variations in film thickness became greater, making the film substantially unsuitable for industrial production. An attempt was made to increase lengthwise draw ratio to form lengthwisely long voids and subject the voids to crosswise drawing, thereby to ultimately make the voids isotropic. As a result, film forming property became poor, so that the film was unsuitable for industrial production. Also, the crosswise draw ratio was tentatively made smaller to result in greater variations in film thickness.

A first object of the present invention is to resolve the above-mentioned problems and provide a polyester film having fine voids, which has high isotropy and superior tear resistance, and a method for manufacture thereof.

A second object of the present invention is to resolve the above-mentioned problems and provide a thermoplastic resin film having fine voids, which has high isotropy, permits only less occurrence of curling by heat and has less variation in thickness, and a method for manufacture thereof.

SUMMARY OF THE INVENTION

According to the present invention, there is provided a polyester film having fine voids, which comprises a polymer mixture comprising a polyester resin and a thermoplastic resin (B) incompatible with said polyester resin, and which has an apparent specific gravity of 0.6–1.3 and an inplane birefringence as determined from the equation:

inplane birefringence=refractive index along lengthwise principal axis–refractive index along crosswise principal axis, of from −0.02 to +0.04; in particular, a polyester film having fine voids, which is prepared by forming a film from a polymer mixture comprising a polyester resin and a thermoplastic resin (B) incompatible with said polyester resin, and biaxially stretching same, and which has an apparent specific gravity of 0.6–1.3 and an inplane birefringence as determined from the equation:

inplane birefringence=refractive index along lengthwise principal axis–refractive index along crosswise principal axis, of from −0.02 to +0.04; and further, the above-mentioned polyester film having fine voids, which has a thickness variation of not more than 10%.

The present invention also relates to a method for manufacturing the above-mentioned polyester film having fine voids, comprising forming an undrawn film from a polymer mixture comprising a polyester resin and a thermoplastic resin (B) incompatible with said polyester resin, drawing the film 3.0 times or more in the lengthwise direction by one step or multiple steps, applying the film to a relaxation treatment in the lengthwise direction by 3% or more, and crosswisely drawing the film at a draw ratio not less than the lengthwise draw ratio after the relaxation treatment. The above-mentioned invention is to be referred to as a first invention.

The present invention further relates to a thermoplastic resin film having fine voids, which comprises a polymer mixture comprising a thermoplastic resin (A) and a thermoplastic resin (B) incompatible with said thermoplastic resin (A), and which has a ratio (L1/L2) of an average length (L1) of the voids at a cross section in the lengthwise direction of the film, to an average length (L2) of the voids at a cross section in the direction forming a right angle with said lengthwise direction, i.e., crosswise direction of the film, of 2/3-3/2, a thickness variation of the film of not more than 5%, and a void content of 5–50% by volume; in particular, a thermoplastic resin film having fine voids, which is prepared by forming a film from a polymer mixture comprising a thermoplastic resin (A) and a thermoplastic resin (B) incompatible with said thermoplastic resin (A), and biaxially stretching the film, and which has a ratio (L1/L2) of an average length (L1) of the voids at a cross section in the lengthwise direction of the film, to an average length (L2) of the voids at a cross section in the direction forming a right angle with said lengthwise direction, i.e., crosswise direction of the film, of 2/3-3/2, a thickness variation of the film of not more than 5%, and a void content of 5–50% by volume; and still particularly, the above-mentioned thermoplastic resin film having fine voids, wherein the thermoplastic resin (A) is a polyester resin.

The present invention also relates to a method for manufacturing the above-mentioned thermoplastic resin film having fine voids, comprising forming an undrawn film from a polymer mixture comprising a thermoplastic resin (A) and a thermoplastic resin (B) incompatible with said thermoplastic resin (A), drawing the film in the lengthwise direction, then drawing the film in the crosswise direction in multiple steps at such a draw ratio that makes the total draw ratio not less than 3.0; and a method for manufacturing the above-mentioned thermoplastic resin film having fine voids, comprising forming an undrawn film from a polymer mixture comprising a thermoplastic resin (A) and a thermoplastic resin (B) incompatible with said thermoplastic resin (A), drawing the film in the lengthwise direction, then drawing the film in the crosswise direction in two steps, that is, first drawing 2.0–2.8 times at a draw temperature of 100°–140° C. and subsequently drawing at a temperature of 140°–230° C. at such a draw ratio that makes the total draw ratio, obtained by multiplying the first draw ratio by the second draw ratio, not less than 3.0. The above-mentioned invention is to be referred to as a second invention.

DETAILED DESCRIPTION OF THE INVENTION

The polyester resin to be used in the first invention of the present invention is prepared by condensation polymerization of an aromatic dicarboxylic acid such as terephthalic acid, isophthalic acid and naphthalene dicarboxylic acid or an ester thereof, with a glycol such as ethylene glycol, diethylene glycol, 1,4-butanediol and neopentyl glycol. This polyester resin can be prepared by, for example, a method wherein aromatic dicarboxylic acid and glycol are directly reacted, a method wherein an alkyl ester of aromatic dicarboxylic acid and glycol are subjected to ester interchange and then condensation polymerization, a method wherein diglycol ester of aromatic dicarboxylic acid is subjected to condensation polymerization, and other methods.

Typical polyester resins are, for example, polyethylene terephthalate, polybutyrene terephthalate and polyethylene-2,6-naphthalate. Said polyester may be a homopolymer or co-polymerized with a third component. In the present invention, an ethylene terephthalate unit, butylene terephthalate unit or ethylene-2,6-naphthalate unit is present in the entire polyester in a proportion of not less than 70% by mole, preferably not less than 80% by mole, and more preferably not less than 90% by mole.

The thermoplastic resin (A) to be used in the second invention of the present invention is exemplified, for example, by the above-mentioned polyesters and polypropylene. Preferred is polyester resin in view of the heat resistance and mechanical strength.

The thermoplastic resin (B) incompatible with the polyester resin to be used in the present invention and the thermoplastic resin (B) incompatible with the thermoplastic resin (A) are subject to no particular limitation insofar as they become void-forming sources by being dispersed in a fine particulate state in the polyester resin or the thermoplastic resin (A) and released, on drawing, in the interface with the polyester resin or the thermoplastic resin (A).

Specific examples include polystyrene resins such as isotactic polystyrene, syndiotactic polystyrene, atactic polystyrene, styrene-butadiene copolymer, acrylonitrile-butadiene-styrene copolymer and high-impact polystyrene (a mixture of styrene and olefin rubber), polyphenylene ether resins, polyolefin resins such as polymethylpentene, polypropylene, polyethylene and cyclic olefin polymer, polyacrylic resins, polycarbonate resins, polysulfonic resins and cellulose resins, with preference given to polystyrene resins and polyolefin resins such as polymethylpentene and polypropylene. These resins may be used alone or in combination.

While the content of said thermoplastic resin (B) varies depending on the desired void content and draw conditions, it is preferably 3–40% by weight when the entire polymer mixture is 100% by weight. When it is less than 3% by weight, void content is only limitatively increased and the desired flexibility, light-weightedness, image drawability and writability tend to be associated with difficulty. On the other hand, when it exceeds 40% by weight, drawability can easily drop and heat resistance, strength and nerve that the polyester resin and the thermoplastic resin (A) possess tend to be easily impaired. A more preferable ratio is 5–15% by weight in the first invention and 6–35% by weight in the second invention.

For improved covering property and image drawability required as necessary, the polymer mixture comprising the above-mentioned polyester resin or a thermoplastic resin (A), and a thermoplastic resin (B) may contain inorganic particles and organic particles. The inorganic particles are not subject to particular limitation and are exemplified by titanium dioxide, silicon dioxide, calcium carbonate, barium sulfate, aluminum oxide, zeolite, kaolin, talc, zinc oxide and carbon black. Examples of the organic particles include crosslinked polymer and organic white pigment.

The polymer mixture may further contain crosslinking agent, coloring, light-resisting agent, fluorescent agent, antistatic agent, ultraviolet absorber and plasticizer as the use demands.

An undrawn film can be prepared from said polymer mixture by the following method. That is, an undrawn film can be prepared by, for example, a method comprising mixing chips of each resin, melt kneading the mixture in an extruder, extruding the mixture and solidifying same, a method comprising previous mixing of the both resins in a mixer, melt extruding the mixture from an extruder and solidifying same, a method comprising adding a thermoplastic resin (B) during polymerization of the polyester resin or thermoplastic resin (A), melt extruding the chips obtained by stirring-dispersing said resin, and solidifying same, and other methods.

The undrawn film thus obtained generally has no or weak orientation. The thermoplastic resin (B) is present in the polyester resin or thermoplastic resin (A) on being dispersed therein in various shapes such as sphere, elliptical sphere and yarn.

The undrawn film is drawn and oriented at least in a single axial direction to form a multitude of fine voids therein. Voids make the film lighter, contribute to good workability and decrease the cost per unit area. In addition, they improve flexibility, enable vivid printing on printing and transcription, and afford light covering property and whiteness. The surface of the film would have numerous protrusions due to the thermoplastic resin (B), thus enabling writing with a pencil or a ball-point pen.

Preparation 1

The polyester film having fine voids of the first invention can be prepared by, for example, the following method. That is, a polymer mixture comprising the above-mentioned polyester resin and at least one kind of the above-mentioned thermoplastic resin (B) incompatible with said polyester resin is formed to give an undrawn film, and the film is drawn 3.0 times or more in the lengthwise direction by one step or multiple steps, subjected to relaxation by 3% or more in the lengthwise direction and drawn in the crosswise direction at a draw ratio not less than the lengthwise draw ratio after the relaxation treatment. This method affords efficient preparation of a film having the above-mentioned properties of apparent specific gravity and inplane birefringence. This method is described in more detail in the following.

In the first lengthwise drawing, the film is drawn in the lengthwise direction (the direction of running) while being run between two or more number of rolls having different circumferential speeds. The heating at this time may comprise the use of heating rolls, or heating by hot air, radiation heat and the like when the film is not in contact with the rolls.

So as to efficiently form numerous voids in the interface with the thermoplastic resin (B) incompatible with the polyester in this lengthwise drawing step, the draw temperature is preferably set for $(Tg+10)–(Tg+50)°$ C. wherein Tg is a glass transition temperature of polyester resin, and draw ratio for 3.0 or more, preferably 3.2–5.0. When the lengthwise draw ratio is less than 3.0, a sufficient amount of fine voids tends not to be formed in the film, which in turn makes it difficult to achieve the apparent specific gravity of the obtained film of not more than 1.3. When the lengthwise draw ratio is not more than 5.0, the relaxation heat treatment thereafter can be sufficiently done, making inplane birefringence of the obtained film easily set for not more than +0.04.

After the lengthwise drawing, the film is subjected to relaxation treatment by not less than 3%, preferably not less than 5% in the lengthwise direction. When the relaxation ratio is not less than 3%, the inplane birefringence of the film after the subsequent crosswise drawing can fall within the range of from –0.02 to +0.04.

It may well be considered that a film having high isotropy can be obtained by using a smaller crosswise draw ratio, without relaxation treatment. In this case, the crosswise drawing becomes markedly nonuniform to the extent that the film cannot have homogeneous isotropy and thickness in the entirety thereof.

While the above-mentioned relaxation ratio may vary according to the ratio of lengthwise drawing before the relaxation, it is preferably determined in such a manner that the lengthwise draw ratio after the relaxation treatment becomes 2.8–3.5. When the lengthwise draw ratio after the relaxation treatment is less than 2.8, relaxation treatment may become nonuniform and the inplane birefringence after biaxial stretching tends to be less than –0.02. When it exceeds 3.5, the drawability in the subsequent crosswise drawing tends to be degraded or the inplane birefringence after the biaxial stretching tends to easily exceed +0.04.

The relaxation is done by, for example, a method comprising once cooling the film and re-heating same to about 80°–150° C. in a heating device such as an oven, a method comprising re-heating, for relaxation treatment, the film between rolls without cooling immediately after the lengthwise drawing, a method comprising relaxation treatment between a group of driven rolls or free rolls heated to 60°–100° C., and a method combining these methods as appropriate. Of these relaxation treatment methods, the most preferred is a method comprising a relaxation treatment for relaxing the tension without cooling immediately after the lengthwise drawing, and this method enables more uniform and efficient relaxation treatment.

After the lengthwise relaxation treatment, the film is led to a tenter and subjected to crosswise drawing at a ratio not less than the lengthwise draw ratio after the relaxation treatment. The preferable draw temperature at this step is not less than the highest temperature during the lengthwise drawing and relaxation treatment and not more than (Tm−10)° C. wherein Tm is a melting point of the polyester resin. When the crosswise draw ratio is smaller than the lengthwise draw ratio after the relaxation treatment, the correction of anisotropy by crosswise drawing cannot be sufficient, to ultimately result in difficulty in making the inplane birefringence of the film not more than +0.04. While the upper limit of the crosswise draw ratio is not particularly limited, it is preferably not more than (lengthwise draw ratio after relaxation treatment+1.0), whereby the inplane birefringence can be certainly made to fall within the range of from −0.02 to +0.04.

The biaxially stretched film thus obtained is subjected to a heat treatment for thermo-setting on demand. The heat treatment is preferably applied in a tenter at a temperature of (Tm−50)−Tm° C. A slight crosswise re-drawing and crosswise relaxation may be applied simultaneously or stepwisely with this heat treatment.

The polyester film having fine voids of the first invention preferably has an apparent specific gravity of 0.6–1.3, more preferably 0.8–1.25. When the apparent specific gravity is less than 0.6, the void content becomes too high to result in insufficient strength of the film and easy occurrence of cracks and wrinkles on the film surfaces, which tend to decrease the product value. On the other hand, a high specific gravity exceeding 1.3 results in insufficient void content and a tendency to inhibit effective exertion of the properties achieved by voids, such as cushioning property and flexibility.

An attempt to forcibly make the apparent specific gravity smaller by excessively increasing the void content results in problems in that the film breaks in the crosswise direction during drawing and stable draw operability cannot be ensured. According to the Preparation 1 above, the void content of the film can be readily increased and the substantial isotropy of the film can be ensured.

The apparent specific gravity can be controlled by adjusting the amount of the thermoplastic resin (B), draw conditions and the like. The apparent specific gravity is determined as noted below.

The polyester film having fine voids preferably has its inplane birefringence of from −0.02 to +0.04, more preferably from 0 to +0.03. By setting the inplane birefringence within the above-mentioned range, the film can be made substantially isotropic. An inplane birefringence of not less than −0.02, preferably not less than 0 makes the film not easily tearable in the crosswise direction. An inplane birefringence exceeding +0.04, however, makes the film easily tearable in the lengthwise direction, which in turn causes breakage during slitting of the film and lengthwise cracks on cutting the film.

An inplane birefringence of + or − here means that the hysteresis of the lengthwise drawing remains in a greater or smaller degree than that of crosswise drawing, and it may accompany slight inclination of the optical principal axis from the machine direction, due to the bowing phenomenon during the crosswise drawing.

Said inplane birefringence can be made to fall within the range specified above by preparing a film according to the above Preparation 1. The inplane birefringence is determined in the manner as described later.

The inplane birefringence of the polyester film having voids, which can be obtained by a conventional method, is mostly less than −0.02, and those having an inplane birefringence exceeding −0.02 have a specific gravity of greater than 1.3. Heretofore, a film having an inplane birefringence of not less than −0.02 and an apparent specific gravity of not more than 1.3 has not been known. This is likely be attributable to the fact that, in the conventional method, forming of voids along with drawing markedly inhibits drawability, making control of the void content very difficult, which in turn makes homogeneous drawing in the lengthwise direction and crosswise direction very hard to attain, makes the inplane birefringence dispersed and inhibits improvement in the properties of synthetic paper, etc.

Moreover, the polyester film having fine voids of the first invention preferably has a thickness variation of not more than 10%, more preferably not more than 8%, and most preferably not more than 6%. A thickness variation exceeding 10% tends to result in degraded product value.

Note that by adjusting draw conditions and the like, the thickness variation can be controlled. The thickness variation is determined as noted below.

Preparation 2

The thermoplastic resin film having fine voids of the second invention can be prepared by, for example, the following method. That is, a polymer mixture comprising the above-mentioned thermoplastic resin (A) and at least one kind of the above-mentioned thermoplastic resin (B) incompatible with said thermoplastic resin (A) is formed to give an undrawn film, and the film is conventionally drawn in the lengthwise direction and then in the crosswise direction by multiple steps at such a draw ratio that makes the total draw ratio not less than 3.0, preferably crosswise drawing by two steps at different temperatures. When the crosswise drawing is conducted over two steps, the film is first drawn 2.0–2.8 times at 100°–140° C. and then at a temperature of 140°–230° C., preferably 160°–230° C. at such a draw ratio that makes the total draw ratio, which is obtained by multiplying the first draw ratio by the second draw ratio, not less than 3.0.

The lengthwise drawing can be done in a conventional manner at, for example, a draw temperature of 70°–120° C. and a draw ratio of 2.5–5.0.

The first crosswise drawing at a lower temperature mainly contributes to the formation of voids well balanced both in the lengthwise and crosswise directions, and the second crosswise drawing at a high temperature mainly contributes to the reduction of thickness variations. In the second and the subsequent crosswise drawing(s), expansion of voids is scarcely observed. The total crosswise draw ratio may exceed the lengthwise draw ratio.

The film after drawing as mentioned above is preferably thermoset. After the drawing, the film is preferably treated at not less than 200° C., more preferably not less than 220° C., and most preferably not less than 230° C. It is preferable that the film be thermo-set while being relaxed by 3–8%. Thermo-setting under the above-mentioned conditions (e.g. temperature and relaxation ratio) can result in a film having voids wherein the heat shrinkage of the film at 150° C. is less than 2%. The heat shrinkage of the film at 150° C. is more preferably less than 1.7% and most preferably less than 1.5%.

The thermoplastic resin film having fine voids of the second invention preferably has a ratio (L1/L2) of an average length (L1) of the voids at a cross section in the lengthwise direction of the film, to an average length (L2) of the voids at a cross section in the direction forming a right angle with said lengthwise direction, i.e., crosswise direction of the film, of 2/3-3/2, more preferably 3/4-4/3. This L1/L2 ratio is a numerical expression of the balance between the width and the length of the voids. When the ratio falls within the above range, the voids are well-balanced and are free of curling by heat. When the ratio is less than 2/3, the voids are longer in the width and when the ratio exceeds 3/2, the voids are longer in the length. These ill-balanced voids tend to result in curling by heat.

The L1/L2 ratio can be adjusted by varying the first crosswise draw temperature and crosswise draw ratio. The L1/L2 ratio is determined in the manner as described later.

The thermoplastic resin film having fine voids preferably contains voids in an amount sufficient to express the properties of the thermoplastic resin film having fine voids. The void content of said thermoplastic resin film having fine voids is preferably 5–50% by volume, more preferably 10–30% by volume. When the void content exceeds 50% by volume, the film contains too much amount of voids, so that it loses its functions as a film, as exemplified by insufficient strength, and suffers from easy occurrence of curling irrespective of the shape of the voids. When the void content is less than 5% by volume, the film contains less amount of voids to the extent that the film can be no longer considered a film containing voids. Such film is free of curling by heat, whereas tends to easily have degraded image drawability, printability and heat-sensitive recording performance.

The void content can be adjusted by varying the lengthwise draw temperature and lengthwise draw ratio, and the first crosswise draw temperature and crosswise draw ratio. The void content is determined in the manner as described later.

The thermoplastic resin film having fine voids of the present invention preferably has a thickness variation of not more than 5%, more preferably not more than 3%. When it exceeds 5%, the film tends to have degraded applicability.

The thickness variation can be adjusted mainly by varying the second crosswise draw temperature and crosswise draw ratio. The thickness variation is determined in the manner as described later.

The film having fine voids of the present invention may have a coating layer on either or both surface(s), by which wettability and adhesiveness of ink or coating agents can be improved.

The materials to be used for forming such coating layer are preferably polyester resins. The materials conventionally used for improving the adhesiveness of polyester films, such as polyurethane resin, polyester urethane resin, polyacrylic resin may be also used.

For forming a coating layer, a conventional method such as gravure coating method, kiss coating method, dipping method, spray coating method, curtain coating method, air knife coating method, blade coating method and reverse roll coating method may be employed.

Such coating layer may be formed before or after the drawing. For example, the material may be previously coated on the surface of the undrawn film; the material may be coated on the surface of the film having voids, which has been drawn in the uniaxial direction, followed by drawing in the direction forming a right angle with the uniaxial direction; or the material may be coated on the surface of the film having voids after drawing.

In the present invention, moreover, a composite film may be prepared by laminating a different layer on the film having voids. For example, different layer may be formed on either or both side(s) of the film having voids to give a composite film having two or more layers. Note that the film having the above-mentioned coating layer is also a composite film.

The material to form the different layer is not particularly limited, and may be a synthetic resin. While the method for preparing such laminated film is not particularly limited, coextrusion laminating comprising extruding the materials for respective layers from different extruders, leading same into a single die to give an undrawn film, and at least uniaxially orienting the film is preferable from the aspect of productivity.

While the thickness of the film having voids is not particularly limited, it is preferably 10–1000 $\mu$m.

When prepared into a composite film, the film of the present invention retains the above-specified respective properties.

The polyester film having fine voids of the first invention of the present invention has, as compared to the conventional film having fine voids, an extremely superior isotropy, excellent tear resistance, extremely superior water resistance, moisture absorption, dimensional stability, surface stability, gloss and vividness of printed matters, and mechanical strength.

The thermoplastic resin film having fine voids of the second invention of the present invention is, as compared to the conventional film having fine voids, superior in isotropy of the voids, accompanied by less curling by heat, has less thickness variations, is light-weighted, and is superior in writability, printability, heat resistance and mechanical strength.

Hence, the film having fine voids of the present invention, which is prepared according to the first or the second invention, is useful for various applications as a base substrate of, for example, label, sticker, poster, card, recording paper, packaging material, video printer image receiving paper, bar code label, bar code printer image receiving paper, heat transfer image recording paper, heat-sensitive recording paper, sublimation transfer recording paper, ink jet image receiving paper, offset printing paper, foam printing paper, map, dust-proof paper, display board, white board, electric white board, printing paper, bottom label, wall paper, building material, bill, release paper, folding paper, calendar, magnetic card, tracing paper, slip, delivery slip, pressure-sensitive paper, copying paper, clinical test paper, parabolic antenna reflector, offset printing plate, PS plate, LBP plate and liquid crystal display reflector.

The present invention is described in more detail in the following by illustrative Examples. The present invention is not subject to any limitation by the following Examples, and the invention can be adequately modified and practiced within the scope commensurate with the scope of the foregoing and subsequent descriptions. All such modified applications are entirely encompassed in the technical scope of the present invention.

The methods for the determination and evaluation employed in the following Examples with regard to the first invention are as follows.

(1) Apparent Specific Gravity

Determined by sink-float method using aqueous solutions of potassium iodide adjusted to have various specific gravities.

(2) Inplane Birefringence

A test film is cut into a 10 cm×10 cm piece and weighed (weight: W g). Using the density $\rho$ (g/cm$^3$, calculated from the weight ratio and density of respective components) of the piece having no voids inside the film, a substantial thickness T (cm) of the film, which is irrelevant to the void content, is obtained from the following equation.

$$T = W/(\rho \times 100)$$

Then, using a molecular orientation meter MOA-2001A manufactured by Kanzaki Paper MFG Co., Ltd., the optical principal axis is determined, and substituting the thickness T obtained above, refractive index in the microwave region is determined along the lengthwise principal axis and crosswise principal axis.

Using these values, inplane birefringence is calculated from the following equation.

$$\text{Inplane birefringence} = \text{refractive index along lengthwise principal axis} - \text{refractive index along crosswise principal axis}$$

(3) Resistance to Tearing of Film: Isotropy

Twenty 20 cm×20 cm square pieces of the test film are prepared. An initial tear to the lengthwise direction is made with scissors in ten out of the twenty pieces. An initial tear to the crosswise direction is made in the remaining 10 pieces. The pieces are torn apart to the front and back directions from the tear with both hands on either side. All 20 pieces are torn in the same manner, and the isotropy thereof is evaluated according to the tear (how the tear has run).

The films having anisotropy in the crosswise direction allow the tear made in the crosswise direction to run straight in more than half of the films and allow the tear in the lengthwise direction to initially run in the lengthwise direction and then to the crosswise direction on its way in more than half of the films. On the other hand, the films having anisotropy in the lengthwise direction shows the opposite behavior from that found in the above-mentioned films having anisotropy in the crosswise direction. Moreover, a film having high isotropy shows random running of the tear.

(4) Thickness Variation of Film

The thickness of the film is measured at 40 points at 5 cm intervals over the length of 2 meters, and average thickness of T $\mu$m, the maximum thickness of $T_{max}$ $\mu$m and the minimum thickness of $T_{min}$ $\mu$m are obtained. The thickness variation is calculated from the following equation:

$$\text{Thickness variation } TV (\%) = [(T_{max} - T_{min})/T] \times 100$$

(5) Inherent Viscosity of Polyester

A polyester is dissolved in a mixed solution of phenol (6 parts by weight) and tetrachloroethane (4 parts by weight) and the inherent viscosity thereof is measured at 30° C.

EXAMPLE 1

A mixture of polyethylene terephthalate (83% by weight) having an inherent viscosity of 0.62, polystyrene (13% by weight) having a melt flow index of 2.0 g/10 min and anatase type titanium dioxide (4% by weight) having an average particle size of 0.3 $\mu$m (by electron microscope method) as a starting material was supplied to an extruder and melt extruded at 290° C. Casting thereof on a cooling drum at 30° C. according to the electrostatic adhesion method gave an undrawn film having a thickness of 1300 $\mu$m.

This film was heated on a roll heated to 70° C., further heated using an infrared heater, and lengthwisely drawn 3.7 times in the lengthwise direction using rolls having different circumpherancial speeds. The temperature of the draw roll at the higher speed side was set to 70° C. Immediately after lengthwise drawing, 14% relaxation treatment was applied between the rolls, without cooling, to adjust the lengthwise drawing ratio after relaxation to 3.2.

Then, the lengthwisely drawn, relaxation-treated film was led to a tenter, preheated at 140° C. for 8 seconds and drawn 3.6 times in the crosswise direction at said temperature. The film was heat treated at 220° C. for 5 seconds, re-drawn 8% in the crosswise direction at said temperature, and heat treated at said temperature for 5 seconds, whereby a 125 $\mu$m thick polyester film having fine voids was prepared.

EXAMPLE 2

In the same manner as in Example 1 above except that a mixture of polyethylene terephthalate (88% by weight), crystalline polypropylene (8% by weight) having a melt flow index of 5.5 g/10 min and anatase type titanium dioxide (4% by weight) was used as a starting material, a 125 $\mu$m thick polyester film having fine voids was prepared.

COMPARATIVE EXAMPLE 1

In the same manner as in Example 2 above except that the lengthwise draw ratio was 3.7 and the lengthwise relaxation was not done, preparation of a biaxially stretched polyester film having fine voids was tried. As a result, breakage frequently occurred during the crosswise drawing.

COMPARATIVE EXAMPLE 2

In the same manner as in Example 2 above except that the lengthwise draw ratio was 3.7, the lengthwise relaxation was not done, the crosswise draw ratio was 3.2, and the re-drawing in the crosswise direction was omitted, a polyester film having fine voids was prepared.

COMPARATIVE EXAMPLE 3

In the same manner as in Example 1 above except that the lengthwise draw ratio was 3.2, and the lengthwise relaxation was omitted, a polyester film having fine voids was prepared.

COMPARATIVE EXAMPLE 4

In the same manner as in Example 1 above except that a mixture of polyethylene terephthalate (91% by weight), polystyrene (5% by weight) and titanium dioxide (4% by weight) was used as a starting material, the lengthwise draw ratio was 3.7, and lengthwise relaxation was omitted, a polyester film having fine voids was prepared.

The properties of the obtained polyester films having fine voids are summarized in Table 1.

TABLE 1

| | Composition of starting material | lengthwise drawing | | | | | Property of film | | | Crosswise thickness variation (TV, %) |
|---|---|---|---|---|---|---|---|---|---|---|
| | | length-wise ratio | Relaxation (%) | Total ratio | Crosswise draw ratio | Drawability Operability | Specific gravity | Birefringence | Isotropy | |
| Ex. 1 | PET/PS/TiO$_2$ = 83/13/4 | 3.7 | 14 | 3.2 | 3.6 × 1.08 = 3.9 | superior | 1.15 | +0.02 | superior | 2.4 |
| Ex. 2 | PET/PP/TiO$_2$ = 88/8/4 | 3.7 | 14 | 3.2 | 3.8 × 1.08 = 3.9 | superior | 1.08 | +0.02 | superior | 1.6 |
| Com. Ex. 1 | PET/PP/TiO$_2$ = 88/8/4 | 3.7 | 0 | 3.7 | 3.6 × 1.08 = 3.9 | frequent break during crosswise drawing | evaluation not possible since film was not obtained | | | — |
| Com. Ex. 2 | PET/PP/TiO$_2$ = 88/8/4 | 3.7 | 0 | 3.7 | 3.2 | frequent break during edge trimming | 1.02 | +0.05 | lengthwise anisotropy | 11.2 |
| Com. Ex. 3 | PET/PS/TiO$_2$ = 83/13/4 | 3.2 | 0 | 3.2 | 3.6 × 1.08 = 3.9 | superior | 1.25 | −0.03 | crosswise anisotropy | 1.6 |
| Com. Ex. 4 | PET/PS/TiO = 91/5/4 | 3.7 | 0 | 3.7 | 3.6 × 1.08 = 3.9 | superior | 1.35 | +0.03 | superior | 2.4 |

Note:
PET = polyethylene terephthalate
PS = polystyrene
PP = polypropylene
TiO$_2$ = titanium dioxide As is evident from Table 1, the polyester films having fine voids obtained in Examples 1 and 2 showed fine operability, inclusive of drawability in the lengthwise and crosswise directions, and had suitable specific gravity, small inplane birefringence and superior isotropy. In contrast, the film of Comparative Example 1 without the relaxation treatment after drawing in the lengthwise direction showed very poor drawability in the crosswise direction. The film of Comparative Example 2 which underwent crosswise drawing at the ratio less than the lengthwise draw ratio suffered from frequent occurrence of breakage during edge trimming due to the greater anisotropy in the lengthwise direction. In addition, small crosswise draw ratio resulted in greater thickness variation and greater dispersion of inplane birefringence. In Comparative Example 3, the lengthwise draw ratio was somewhat reduced and the crosswise draw ratio was increased. As a result, the void content did not become sufficiently high to result in higher specific gravity, and its inplane birefringence of less than −0.02 generated crosswise anisotropy. In Comparative Example 4, the thermoplastic resin (B) was added in a less amount. As a result, the film showed satisfactory inplane birefringence and good isotropy. However, the film showed insufficient forming of the voids to result in greater specific gravity and was markedly inferior to the films of Examples 1 and 2 in flexibility and writability. Consequently, the films of Comparative Examples 1 to 4 were not superior enough to accomplish the objects of the present invention.

The first invention of the present invention is able to provide a polyester film having fine voids, which has an enhanced isotropy, excellent tear resistance, extremely superior water resistance, moisture absorption, dimensional stability, surface stability, gloss and vividness of printed matters and mechanical strength, as accomplished by specifying the apparent specific gravity of the polyester film having fine voids and setting the inplane birefringence in a specific range. The method of the present invention, moreover, enables industrial production, with good productivity, of the above-mentioned polyester film having fine voids, which is superior in properties.

The methods for the determination and evaluation employed in the following Examples with regard to the second invention are as follows.

(6) Void Content

A 5.00×5.00 cm square film is precisely cut out and the thickness thereof at 50 points is measured to give an average thickness of t μm. The weight thereof is measured to 0.1 mg and expressed as w g, so that the apparent density ρ' is calculated from the following equation:

$$\text{Apparent density } \rho' \text{ (g/cm}^3\text{)} = \frac{W}{5.00 \times 5.00 \times t \times 10^{-4}}$$

Then, the void content v is calculated from the following equation using the density (g/cm$^3$) a1, a2, a3 . . . of the starting material used and the mixed mass (%) b1, b2, b3 . . . of the starting material:

Void content $v$ (volume %)=100−ρ'×(b1/a1+b2/a2+b3/a3 . . . )

(7) Average Length of Voids

The lengthwise and crosswise sections of a film are magnified 1000 times with a scanning type electron microscope and photographed. The length of the voids is measured using an image analyzer, in the direction forming a right angle with the direction of the thickness of the film.

The scanning type electron microscope used: Type S-510 manufactured by Hitachi, Ltd.

The analyzer used: Using an image scanner GT-8000 manufactured by Seiko Epson Corporation and a personal computer Mackingtosh, images are taken in into a Mackingtosh's software Adobe Photoshop TM2.5J and the images are treated using a Mackingtosh's software Ultimage TM 242.1.1.

(8) Thermal Shrinkage

A 10 mm wide 250 mm long film is marked at two points at a 200 mm interval in the direction of the length of the film, and fixed under a constant tension of 5 g. The interval A mm between the marks is measured. The film is left standing with no tension applied for 30 minutes, placed in an oven at 150° C. and the interval B (after above treatment) between the marks is measured in the same manner as above. The thermal shrinkage is determined from the following equation:

Thermal shrinkage (%)=(A−B)/A×100

(9) Light Permeation Ratio

According to JIS-K6174, the total light permeation ratio of the film is measured using a Poyic integral spherical H.T.R meter (manufactured by Nippon Seimitsu Kogaku). The smaller this value is, the higher the covering property is.

(10) Curling by Heat

An anchor layer having the following composition is formed on the surface of the film, an image receiving layer having the following composition is formed thereon, and an image from the computer is actually printed out from a color hard copier (D-SCAN CH-5504, manufactured by Seiko Instruments Inc.). When a curling is not found in the printed-out product, the film is evaluated as ◯ and when it is found, the film is evaluated as ×.

| Anchor layer | |
|---|---|
| Urethane dry-lami agent (A-130, manufactured by Takeda Chemical Industries, Ltd. ) | 100 parts by weight |
| Curing agent (A-3, manufactured by Takeda Chemical Industries, Ltd.) | 30 parts by weight |
| Image receiving layer | |
| Vinyl chloride/vinyl acetate copolymer ($#1000D, manufactured by Denki Kagaku Kogyo Kabushiki Kaisha) | 100 parts by weight |
| Amino-modified silicone (X-22-343, manufactured by Shin-Etsu Chemical Co., Ltd.) | 3 parts by weight |
| Epoxy-modified silicone (KF-393, manufactured by Shin-Etsu Chemical Co., Ltd.) | 3 parts by weight |
| Methyl ethyl ketone/toluene (weight ratio 1/1) | 500 parts by weight |

(11) Lost Images

When the image printed out in (9) does not have any missing part, the film is evaluated as ◯ and when it is found, the film is evaluated as ×.

(12) Thickness Variation of Film

A 10.00 cm×10.00 cm square film is precisely cut out and the thickness thereof at 100 points is measured to give an average thickness of T $\mu$m, the maximum thickness of $T_{max}$ $\mu$m and the minimum thickness of $T_{min}$ $\mu$m. The thickness variation is calculated from the following equation:

Thickness variation $TV$ (%)=[($T_{max}$×$T_{min}$)/$T$]×100

(13) Inherent Viscosity of Polyester

Determined in the same manner as in (5) above.

EXAMPLE 3

A mixture of polyethylene terephthalate (80% by weight) having an inherent viscosity of 0.62, polystyrene for general use (15% by weight, T575-57U, manufactured by Mitsui Toatsu Chemicals, Inc.) and anatase type titanium dioxide having an average particle size of 0.35 $\mu$m (5% by weight, TA-300 manufactured by Fuji Titan Corp.) as a starting material was cast in a biaxial screw extruder and melt extruded from T-die at 290° C. Electrostatic adhesion to and solidifying thereof on a cooling rotation roll gave an undrawn sheet of the polymer mixture, having a thickness of about 900 $\mu$m. The sheet was lengthwisely drawn 3.5 times using roll drawing machine at 80° C. The sheet was crosswisely drawn 2.7 times at 125° C. and 1.3 times in the crosswise direction at 220° C. using a tenter. The sheet was heat treated at 235° C. while relaxing by 4%, whereby a 100 $\mu$m thick polyester film having numerous fine voids inside was prepared.

EXAMPLE 4

In the same manner as in Example 3 except that a mixture of polyethylene terephthalate (85% by weight) having an inherent viscosity of 0.62, crystalline polypropylene (10% by weight, FO-50F, manufactured by Mitsui Toatsu Chemicals, Inc.) and titanium dioxide (5% by weight, TA-3000) was used as a starting material, a polyester film having fine voids was prepared.

COMPARATIVE EXAMPLES 5 AND 6

In the same manner as in Example 3 except that the mixing ratio (% by weight) of polyethylene terephthalate, polystyrene for general use and titanium dioxide used as starting materials was 92/3/5 and 55/40/5, respectively, polyester films having fine voids were prepared.

COMPARATIVE EXAMPLES 7, 8 AND 9

In the same manner as in Example 3 above except that a one step crosswise drawing was applied, the draw temperature was set to 110° C., 135° C. and 180° C., respectively, and the draw ratio was 3.6 for all Examples, polyester films having fine voids were prepared.

COMPARATIVE EXAMPLE 10

In the same manner as in Example 4 except that a one step crosswise drawing was applied, the draw temperature was set to 180° C., and the draw ratio was 3.6, a polyester film having fine voids was prepared.

COMPARATIVE EXAMPLES 11 AND 12

In the same manner as in Example 3 except that a one step crosswise drawing was applied, the draw temperature was set to 125° C., and the draw ratio was 2.2 and 2.6, respectively, polyester films having fine voids were prepared.

The properties of the films obtained in the above Examples are shown in Table 2.

TABLE 2

|  | Ex. 3 | Ex. 4 | Comp. Ex. 5 | Comp. Ex. 6 | Comp. Ex. 7 | Comp. Ex. 8 | Comp. Ex. 9 | Comp. Ex. 10 | Comp. Ex. 11 | Comp. Ex. 12 |
|---|---|---|---|---|---|---|---|---|---|---|
| Thermoplastic resin (B) | | | | | | | | | | |
| Kind | PS | PP | PS | PS | PS | PS | PS | PP | PS | PS |
| Content (wt %) | 15 | 10 | 3 | 40 | 15 | 15 | 15 | 10 | 15 | 15 |
| Crosswise drawing | | | | | | | | | | |
| First step Temperature °C. | 125 | 125 | 125 | 125 | 110 | 135 | 180 | 180 | 125 | 125 |
| First step Ratio (−) | 2.7 | 2.7 | 2.7 | 2.7 | 3.6 | 3.6 | 3.6 | 3.6 | 2.0 | 2.6 |
| Second step Temperature °C. | 220 | 220 | 220 | 220 | none | none | none | none | none | none |
| Second step Ratio (−) | 1.3 | 1.3 | 1.3 | 1.3 | none | none | none | none | none | none |
| Void content (% by volume) | 20.7 | 26.8 | 4.2 | 57.5 | 24.4 | 20.7 | 4.0 | 2.7 | 17.8 | 20.0 |
| Average length of voids | | | | | | | | | | |
| Lengthwise direction L1 ($\mu$m) | 4.0 | 6.5 | 3.2 | 4.9 | 4.1 | 4.2 | 3.8 | 6.3 | 3.9 | 4.0 |
| Crosswise direction L2 ($\mu$m) | 4.2 | 7.0 | 3.3 | 5.6 | 8.9 | 6.9 | 2.2 | 3.3 | 3.1 | 4.8 |
| L1/L2 (−) | 0.95 | 0.87 | 0.97 | 0.88 | 0.46 | 0.61 | 1.73 | 1.91 | 1.26 | 0.83 |
| Thermal shrinkage (%) Lengthwise direction/ crosswise direction | 1.2/0.7 | 1.2/0.6 | 1.1/0.5 | 1.4/0.8 | 1.2/1.1 | 1.3/0.8 | 1.1/0.4 | 1.2/0.4 | 1.1/0.5 | 1.1/0.6 |
| Light permeation (%) | 10 | 7 | 14 | 5 | 9 | 10 | 14 | 13 | 13 | 11 |
| Presence of curling | ○ | ○ | ○ | X | X | X | ○ | ○ | ○ | ○ |
| Lost images | ○ | ○ | X | ○ | ○ | ○ | X | X | ○ | ○ |
| Thickness variation TV (%) | 0.8 | 1.0 | 0.6 | 1.3 | 1.3 | 1.0 | 5.8 | 5.1 | 5.8 | 5.2 |

The films of Examples 3 and 4 obtained according to the method specified in the present invention, in which crosswise drawing at the total draw ratio of 3.5 (2.7×1.3) by two step drawing was employed, satisfied the requirements in terms of isotropy of voids and thickness variation to be achieved by the present invention, had suitable void content and were free of defects such as curling by heat.

The films of Comparative Examples 5 and 6 obtained according to the two step crosswise drawing had isotropic voids. However, the former film contained less amount of voids, which in turn means that the film was insufficient in the functions afforded by fine voids contained in the film, such as flexibility, light-weightedness, image drawability and printability. The latter film contained too much amount of voids, due to which curling by heat took place, notwithstanding the fact that the voids were isotropic, and certain functions of the film, such as mechanical strength, were apparently impaired.

The films of Comparative Examples 7 and 8 obtained by a conventional method comprising one step 3.6-fold crosswise drawing had small ratio L1/L2 of voids, which in turn means that the voids were crosswisely longer, and were subject to curling by heat.

The films of Comparative Examples 9 and 10 obtained by a conventional method comprising one step crosswise drawing at higher crosswise draw temperature contained less amounts of voids, the voids being lengthwisely longer, and the films showed greater thickness variations. The less content of voids suggests their inferiority in flexibility, light-weightedness, image drawability and printability. Note, however, that the less content of voids also resulted in less curling by heat.

The films of Comparative Examples 11 and 12 obtained by a conventional method comprising one step crosswise drawing at smaller draw ratios had isotropic voids and were free of curling by heat, whereas they had greatly varied thicknesses.

The thermoplastic film having fine voids of the second invention of the present invention is light-weighted, has flexibility, covering property and image drawability, like the conventional polyester film having fine voids which is produced using polystyrene, polyolefin and the like as void-forming agents, and is accompanied by less curling by heat. Therefore, the film is particularly useful as sublimation transfer recording paper, heat transfer recording paper, heat-sensitive recording paper, printing sheet, label, poster, recording paper, packaging material, slip, courier delivery slip, copying paper, pressure-sensitive paper and the like.

What is claimed is:

1. A polyester film having fine voids, which comprises a polymer mixture comprising a polyester resin and a thermoplastic resin (B) incompatible with said polyester resin, which has an apparent specific gravity of 0.6–1.3 and an inplane birefringence as determined from the equation:

$$\text{inplane birefringence} = \text{refractive index along lengthwise principal axis} - \text{refractive index along crosswise principal axis},$$

of from −0.02 to +0.04, and which has a thickness variation of not more than 10%.

2. The polyester film having fine voids of claim 1, which is prepared by forming a film from a polymer mixture comprising a polyester resin and a thermoplastic resin (B) incompatible with said polyester resin, and biaxially stretching same.

3. A polyester film having fine voids, which comprises a polymer mixture comprising a thermoplastic resin (A) and a thermoplastic resin (B) incompatible with said thermoplastic resin (A), and which has a ratio (L1/L2) of an average length (L1) of the voids at a cross section in the lengthwise direction of the film, to an average length (L2) of the voids at a cross section in the direction forming a right angle with said lengthwise direction, i.e., crosswise direction of the film, of 2/3-3/2, a thickness variation of the film of not more than 5%, and a void content of 5–50% by volume.

4. The polyester film having fine voids of claim 3, which is prepared by forming a film from a polymer mixture comprising a thermoplastic resin (A) and a thermoplastic resin (B) incompatible with said thermoplastic resin (A), and biaxially stretching the film, and which has a ratio (L1/L2) of an average length (L1) of the voids at a cross section in the lengthwise direction of the film, to an average length (L2) of the voids at a cross section in the direction forming a right angle with said lengthwise direction, i.e., crosswise direction of the film, of 2/3-3/2, a thickness variation of the film of not more than 5%, and a void content of 5–50% by volume.

5. The polyester film having fine voids of claim 3, wherein the above-mentioned thermoplastic resin (A) is a polyester resin.

6. The thermoplastic resin film having fine voids of claim 4, wherein the above-mentioned thermoplastic resin (A) is a polyester resin.

\* \* \* \* \*